United States Patent [19]
van der Griendt et al.

[11] Patent Number: 5,682,816
[45] Date of Patent: Nov. 4, 1997

[54] TWO STAGE FEEDING APPARATUS AND METHOD FOR FEEDING ARTICLES TO A PRINTING MACHINE

[75] Inventors: Pieter S. van der Griendt, Far Hills; Paul Cino, Clifton, both of N.J.

[73] Assignee: Polytype America Corporation, Union City, N.J.

[21] Appl. No.: 634,579

[22] Filed: Apr. 18, 1996

[51] Int. Cl.$^6$ ............................................. B41F 17/00
[52] U.S. Cl. .................. 101/37; 101/40.1; 414/790.5; 414/743; 414/797; 414/784
[58] Field of Search ................... 101/35, 36, 37, 101/43, 44, 40, 40.1; 414/788.1, 788.5, 788.7, 789.1, 789.3, 789.9, 790.5, 790.6, 790.8, 791.1, 793.9, 794, 743, 757, 758, 784, 911

[56] References Cited

U.S. PATENT DOCUMENTS

| | | | |
|---|---|---|---|
| 1,657,382 | 1/1928 | Felten | 101/37 |
| 2,625,098 | 1/1953 | Robbins et al. | 101/40 |
| 3,434,602 | 3/1969 | Vann, III | 414/784 |
| 4,051,775 | 10/1977 | Watson | 414/743 |
| 4,344,727 | 8/1982 | Chaloupka | 414/790.5 |
| 4,925,120 | 5/1990 | Meier | 414/784 |
| 5,119,109 | 6/1992 | Robertson | 101/35 |
| 5,304,030 | 4/1994 | Neri | 414/743 |

*Primary Examiner*—Eugene H. Eickholt
*Attorney, Agent, or Firm*—Thomas E. Anderson

[57] ABSTRACT

A two stage feeding apparatus and method for feeding articles to a printing machine are disclosed. The apparatus comprises a transfer tray between a conventional stack loading mechanism and a conventional printing machine feeding mechanism. The transfer tray is both movable between a horizontal loading position and an inclined transitional position, and rotatable between the inclined transitional position and an inclined unloading position. The method comprises two stages of which a first stage involves moving the transfer tray between the horizontal loading position and the inclined transitional position, and a second stage involves rotating the transfer tray between the inclined transitional position and the inclined unloading position.

15 Claims, 4 Drawing Sheets

TWO STAGE FEEDING APPARATUS AND METHOD FOR FEEDING ARTICLES TO A PRINTING MACHINE

FIELD OF THE INVENTION

The present invention relates generally to printing machines and, more particularly, to a two stage feeding apparatus and method for feeding articles to a printing machine.

DESCRIPTION OF THE PRIOR ART

Printing machines for cups, tubs, buckets, and the like typically operate by procuring an individual cup, tub, bucket, or like article which will be subject to printing from a stack of the same. The stack of articles is usually vertically aligned with or tilted at an inclined angle in relation to an infeed section of the printing machine so as to allow the stack of articles to slide toward the infeed section of the printing machine and thereby provide a continuous supply of articles thereto. As more and more articles in the stack are procured by the printing machine, the stack must be replenished with more and more articles.

Existing mechanisms for feeding articles which will be subject to printing to the infeed section of a printing machine comprise a loading arm which is movable between a horizontal loading position and an inclined feeding position. Such a loading arm is typically a tray which holds a stack of articles which will be subject to printing, and the loading arm transitions between the loading position and the feeding position so as to provide a continuous supply of the articles to the infeed section of the printing machine. The loading arm stays in the feeding position until all of the articles contained therein have been procured by the printing machine, or the level of the stack of such articles has been diminished to a point below where there are no longer any articles in the loading arm tray. At this time the loading arm will transition to the loading position where a new stack of articles will be loaded into the tray. The loading process is typically performed by a roller chain or a movable holder which require that the loading tray be in a horizontal position. After the new stack of articles has been loaded, the loading arm will transition back to the inclined feeding position wherein the new stack of articles will slide toward the infeed section of the printing machine so as be directly procured by the printing machine, or appended to any remaining articles of the previously loaded stack of articles.

There are several problems associated with the above-described feeding process. The most prevalent of these problems involves the newly loaded stack of articles directly impacting the infeed section of the printing machine, or impacting any remaining articles of the previously loaded stack of articles. This problem commonly results in "double feeding" at the infeed section of the printing machine, which occurs when two articles are forcibly introduced into the infeed section of the printing machine rather than only the required one. The cause of this problem is that during the time the loading arm is transitioning between the loading position and the feeding position, and vice versa, a gap is created between the new stack of articles and the infeed section of the printing machine, or any remaining articles of the previously loaded stack of articles. Thus, the new stack of articles gains considerable force as it slides along this gap toward the infeed section of the printing machine, which results in the "double feeding" problem.

Another problem that results from the sliding of the newly loaded stack of articles along the gap toward the infeed section of the printing machine is that the rims of the articles are easily damaged by such sliding. The amount of damage is directly proportional to the distance, or gap, created between the new stack of articles and the infeed section of the printing machine, or any remaining articles of the previously loaded stack of articles.

To alleviate these above-mentioned problems, existing printing machines employ hold back systems and/or escapements. However, these devices can be complicated and expensive, and require new parts and/or adjustments to fit the industry standard size range for different size articles. Thus, it would be both novel and desirable to provide a feeding apparatus and method for feeding articles to a printing machine which overcome the above-mentioned problems.

SUMMARY OF THE INVENTION

The present invention contemplates a two stage feeding apparatus and method for feeding articles to a printing machine. The present invention is realized by providing a transfer tray between a conventional stack loading mechanism and a conventional printing machine feeding mechanism. The transfer tray is both movable between a horizontal loading position and an inclined transitional position, and rotatable between the inclined transitional position and an inclined unloading position. Thus, the two stages of the present invention comprise a first stage which involves moving between the horizontal loading position and the inclined transitional position, and a second stage which involves rotating between the inclined transitional position and the inclined unloading position.

The transfer tray is loaded in the horizontal loading position with a stack of articles which will be subject to printing. The loading of the transfer tray is performed by a conventional roller chain or movable holder. The transfer tray is unloaded in the inclined unloading position, whereby the stack of articles is unloaded into a conventional feeding tray of a printing machine.

The loading of the transfer tray occurs immediately after every new stack of articles is unloaded into the conventional feeding tray. After it is loaded, the transfer tray moves into the transitional position and waits until the number of articles remaining in the conventional feeding tray has diminished to the point where the new stack of articles can be loaded directly therebehind. At this point, the transfer tray rotates from the transitional position to the unloading position and unloads the new stack of articles directly behind the remaining articles. Thus, no gap is created between the new stack of articles and the remaining articles and the new stack of articles will not induce "double feeding" or rim damage.

From the above descriptive summary it is apparent how the present invention apparatus and method overcome the shortcomings of the above-mentioned prior art.

Accordingly, the primary objective of the present invention is to provide a two stage feeding apparatus and method for feeding articles to a printing machine.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

PREFERRED EMBODIMENT OF THE PRESENT INVENTION

Figure 1:
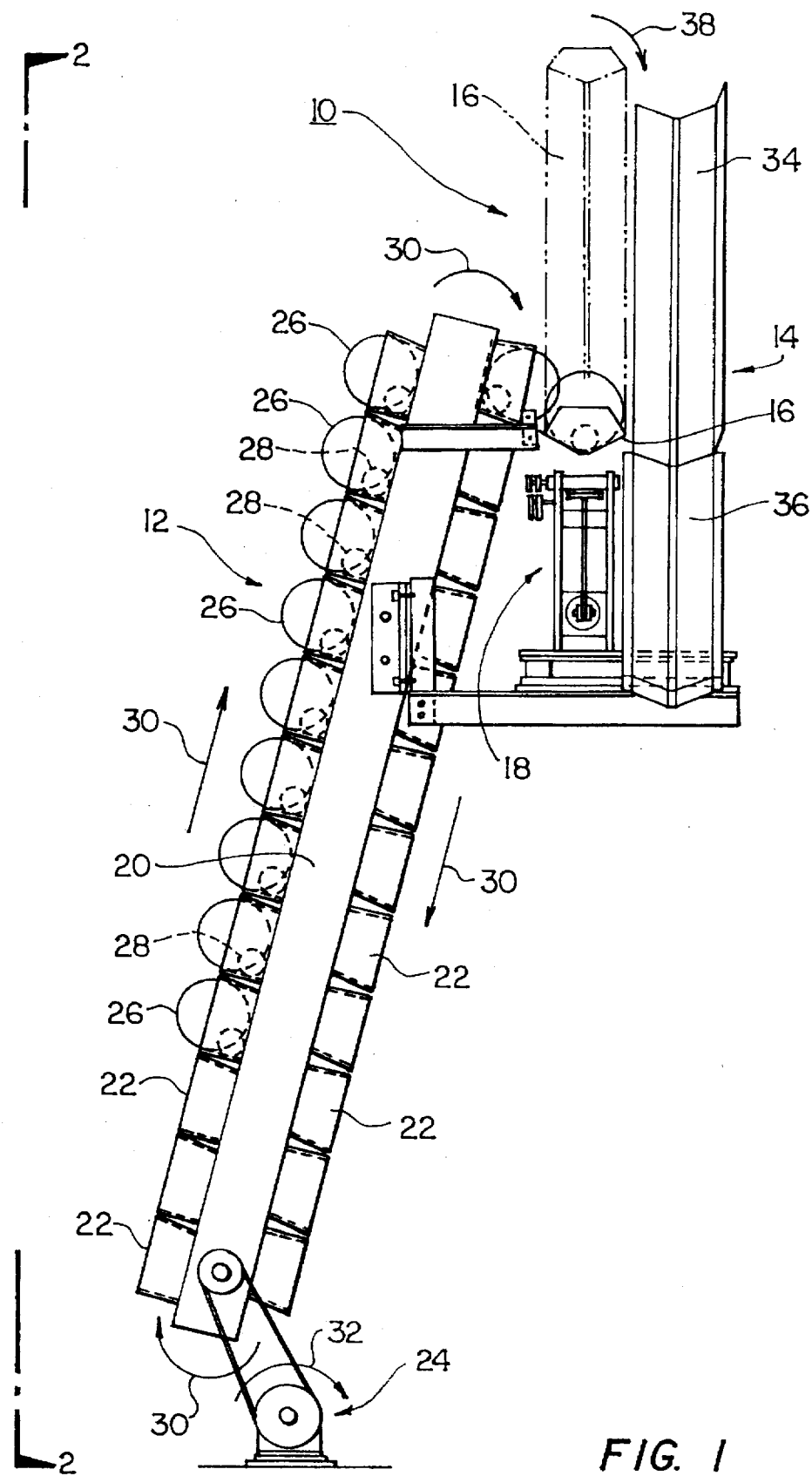
FIG. 1 is an front end view of a two stage feeding apparatus for feeding articles to a printing machine according to the present invention.

Referring to FIG. 1, there is shown a front end view of a two stage feeding apparatus 10 for feeding articles to a printing machine according to the present invention. Also shown in FIG. 1 are a conventional loading mechanism 12 and a conventional feeding mechanism 14 for use with the present invention two stage feeding apparatus 10. Of course, the present invention two stage feeding apparatus 10 may be used with other types of loaders and feeders.

The two stage feeding apparatus 10 comprises a transfer tray 16 and means 18 for controlling the position of the transfer tray 16. The conventional feeding mechanism 14 comprises an upper 34 and a lower 36 feeding tray. The conventional loading mechanism 12 comprises roller chain conveying means 20 having a plurality of vessels 22 attached thereto, and drive means 24 for driving the roller chain conveying means 20. The plurality of vessels 22 are used for holding stacks of articles 26 or 28 as they are carried upward along the roller chain conveying means 20. Both large diameter 26 and small diameter 28 stacks of articles are shown throughout FIGS. 1 and 3 to illustrate the versatility of the present invention two stage feeding apparatus 10, along with the conventional loading mechanism 12 and the conventional feeding mechanism 14, in handling articles of different size. It should be noted, however, that typically only one stack of articles 26 or 28 is carried per vessel 22 of the conventional loading mechanism 12, or handled by the two stage feeding apparatus 10, at any one time.

The direction of motion of the roller chain conveying means 20 is shown by arrows 30, and the direction of the drive means 24 is shown by arrow 32. Thus, it can be readily seen that the stacks of articles 26 or 28 are carried in their associated vessels 22 in an upward direction along the roller chain conveying means 20. At this point it should be noted that the roller chain conveying means 20 can be moving at either a slow continuous rate or with intermittent steps to compensate for the concurrent operation of the two stage feeding apparatus 10, as will be described in more detail below.

Once the vessels 22, and hence the stacks of articles 26 or 28 contained therein, reach the top of the roller chain conveying means 20, the stacks of articles 26 or 28 are loaded into the transfer tray 16 of the two stage feeding apparatus 10. The stacks of articles 26 or 28 are loaded into the transfer tray 16 when it is in a horizontal loading position. At this point it should be noted that, for illustrative purposes, FIG. 1 shows the transfer tray 16 both in the horizontal loading position and in an inclined transitional position. Of course, the transfer tray 16 can only be in one of these positions at any one time.

The transfer tray 16 is moved between the horizontal loading position and the inclined transitional position by controlling means 18, which is typically an actuator of the electrical, hydraulic, or pneumatic type. The movement between the horizontal loading position and the inclined transitional position generally only consists of introducing a pitch to the transfer tray 16 by raising one end thereof with the other end behaving like a hinge. Of course, many other types of mobility maneuvers may be involved in moving between the horizontal loading position and the inclined transitional position and thus they are within the scope of the present invention.

Once the transfer tray 16 arrives at the inclined transitional position, it remains in this position until the number of articles (not shown) remaining in the upper feeding tray 34 has diminished to the point where the stack of articles 26 or 28 being held by the transfer tray 16 can be loaded directly therebehind. At that point, the transfer tray 16 rotates in the direction shown by arrow 38 from the inclined transitional position to the inclined unloading position and unloads the stack of articles 26 or 28 into the upper feeding tray 34 directly behind the remaining articles (not shown). The transfer tray 16 is rotated from the inclined transitional position to the inclined unloading position, and vice versa, by controlling means 18, which, again, is typically an actuator of the electrical, hydraulic, or pneumatic type. At this point it should be noted that the number of articles (not shown) remaining in the upper feeding tray 34 is sensed by sensing means 52 (see FIGS. 2 and 4) such as an optical beam sensor or a positional switch.

Once the transfer tray 16 unloads the stack of articles 26 or 28, it rotates back to the inclined transitional position and moves to the horizontal loading position so as to accept another stack of articles 26 or 28 from the conventional loading mechanism 12.

Figure 2:
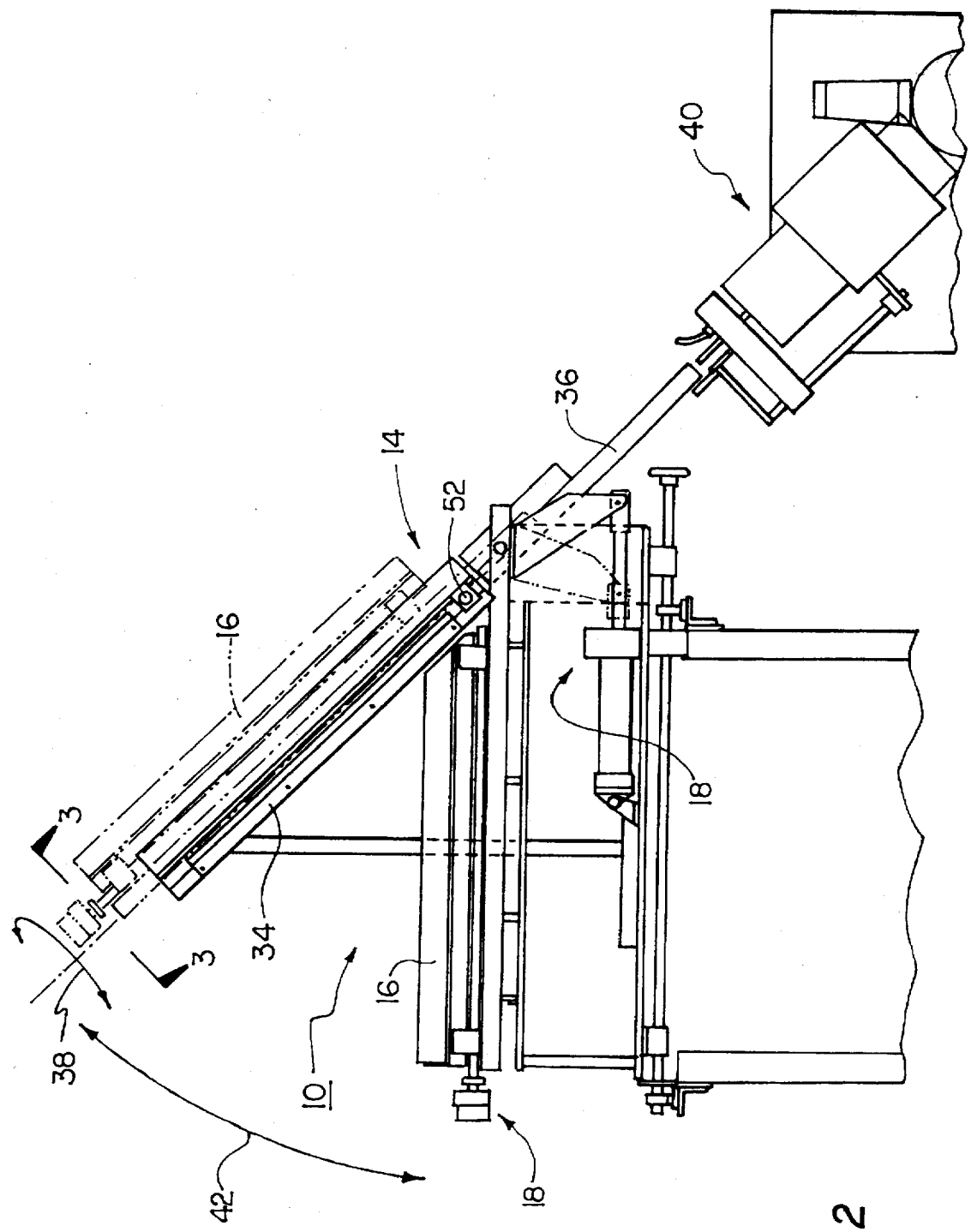
FIG. 2 is a side view of the present invention two stage feeding apparatus shown in FIG. 1, taken along line 2—2 of FIG. 1, with the conventional loading mechanism and the stacks of articles removed.

Referring to FIG. 2, there is shown a side view of the present invention two stage feeding apparatus 10 shown in FIG. 1 with the conventional loading mechanism 12 and the stacks of articles 26 and 28 removed. Also shown in FIG. 2 is an infeed section 40 of a conventional printing machine. At this point it should be noted that, similar to FIG. 1, FIG. 2 shows the transfer tray 16 both in the horizontal loading position and in the inclined transitional position for illustrative purposes.

It can be readily seen from FIG. 2 that the pitch of the upper 34 and lower 36 feeding trays would certainly allow a stack of articles accommodated therein to slide downward toward the infeed section 40 of the conventional printing machine. It can also be readily seen from the FIG. 2 that the movement of the transfer tray 16 between the horizontal loading position and the inclined transitional position, as indicated by arrow 42, is considerable. It should be noted, however, that this movable distance need only be as great as the distance between the position where the conventional loading mechanism loads the transfer tray 16 and the position where the transfer tray 16 is unloaded next to the conventional feeding mechanism 14, and this distance is determined by the pitch required to allow the stack of articles to slide down the upper 34 and lower 36 feeding trays toward the infeed section 40 of the conventional printing machine.

Figure 3:
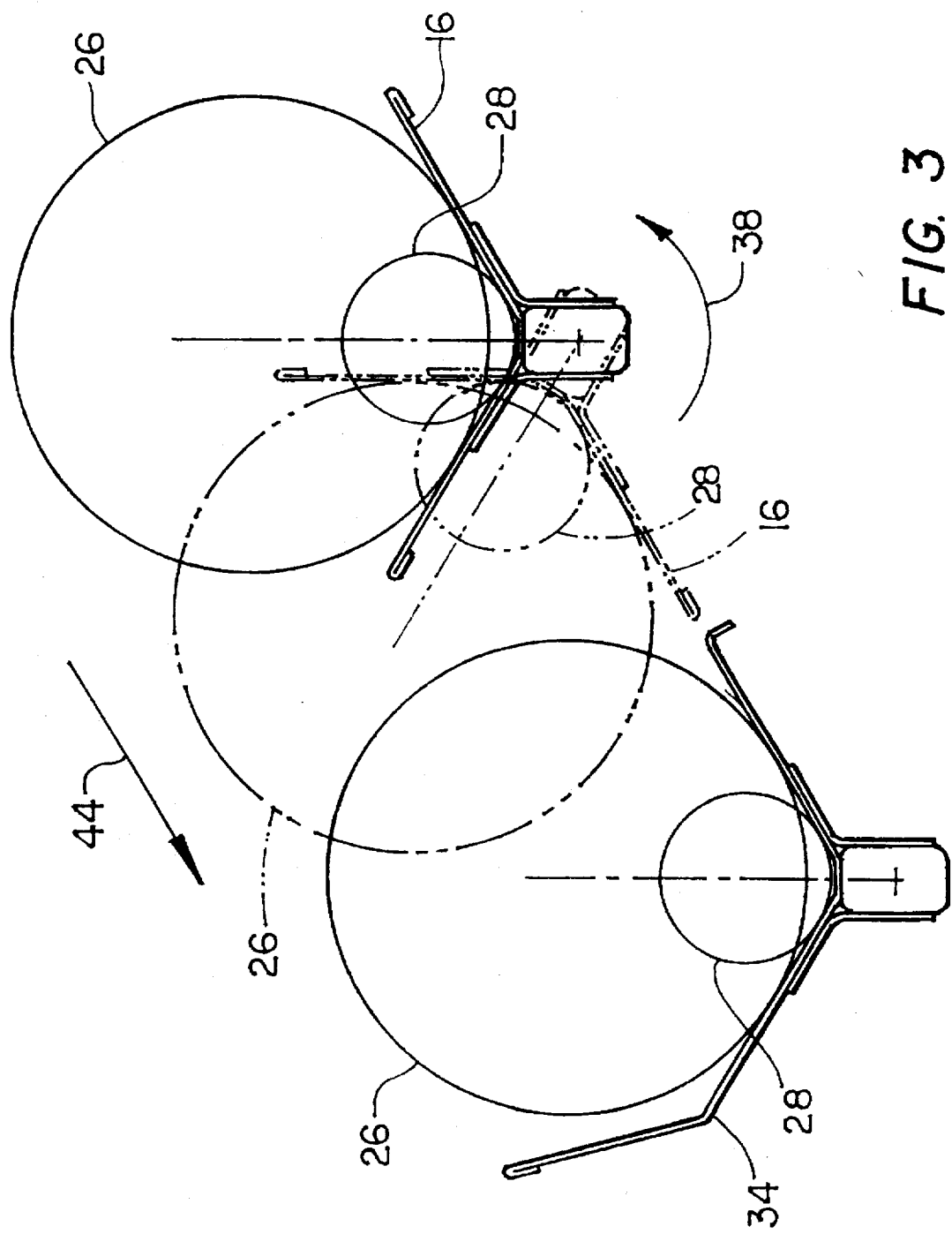
FIG. 3 is an isolated rear end view of the transfer tray and the upper feeding tray shown in FIG. 2, taken along line 3—3 of FIG. 2.

Referring to FIG. 3, there is shown an isolated rear end view of the transfer tray 16 of the present invention two stage feeding apparatus 10 and the upper feeding tray 34 of the conventional feeding mechanism 14. Also shown in FIG. 3 are both the large diameter 26 and small diameter 28 stacks of articles to illustrate the versatility of the present invention two stage feeding apparatus 10, along with the conventional loading mechanism 12 and the conventional feeding mechanism 14, in handling articles of different size.

For illustrative purposes, FIG. 3 shows the transfer tray 16 in both the inclined transitional position and the inclined unloading position. The direction in which the stacks of articles 26 or 28 are unloaded from the transfer tray 16 and into the upper feeding tray 34, when the transfer tray 16 is in the inclined unloading position, is indicated by arrow 44.

Figure 4:
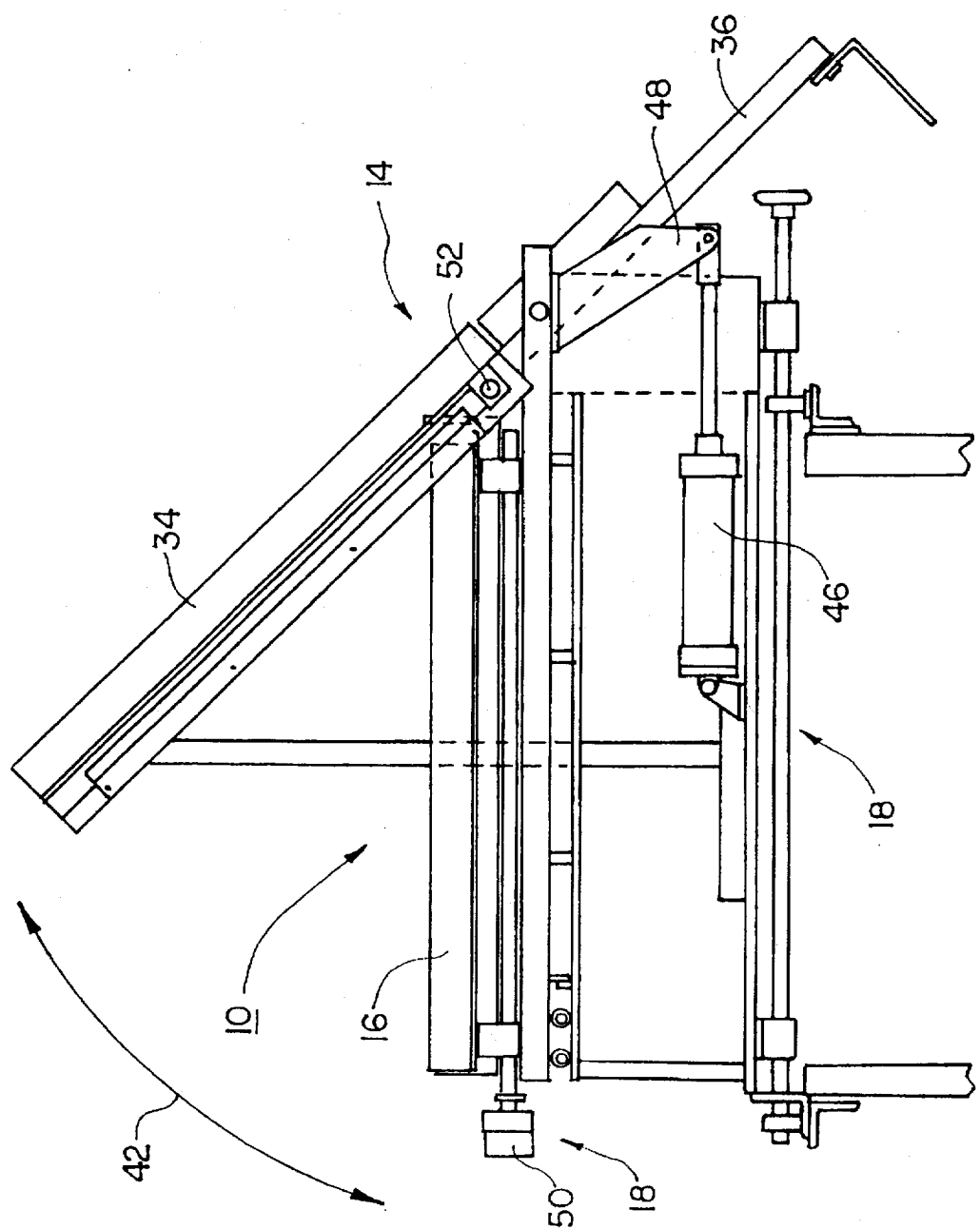
FIG. 4 is another side view of the present invention two stage feeding apparatus shown in FIG. 1, also taken along line 2—2 of FIG. 1, with the conventional loading mechanism and the stacks of articles removed.

Referring to FIG. 4, there is shown another side view of the present invention two stage feeding apparatus 10 with the conventional loading mechanism 12 and the stacks of articles 26 and 28 removed. This view, however, only shows the transfer tray 16 in the horizontal loading position, and does not show an infeed section of a conventional printing machine. Nevertheless, the means 18 for controlling the position of the transfer tray 16 is more visible from this view.

In this particular embodiment of the present invention two stage feeding apparatus 10, the controlling means 18 comprises a hydraulic or pneumatic cylinder 46 and various linkages 48 for controlling the movement of the transfer tray 16 between the horizontal loading position and the inclined transitional position, and a pneumatic actuator 50 for controlling the rotation of the transfer tray 16 between the inclined transitional position and the inclined unloading position. Of course, other types of devices may be used for controlling the position of the transfer tray 16, and thus these other devices are within the scope of the present invention.

The present invention is not to be limited in scope by the specific embodiment described herein. Indeed, various modifications to the present invention, in addition to those described herein, will be apparent to those of skill in the art from the foregoing description and accompanying drawings. Thus, such modifications are intended to fall within the scope of the appended claims.

What is claimed is:

1. A two stage feeding apparatus for feeding articles to a printing machine, said apparatus comprising a transfer tray disposed between a conventional stack loading mechanism and a conventional printing machine feeding mechanism, said transfer tray being movable between a substantially horizontal loading position and an inclined transitional position, said transfer tray being rotatable between said inclined transitional position and an inclined unloading position, said transfer tray being loaded with a stack of articles in said substantially horizontal loading position, said stack of articles being unloaded from said transfer tray in said inclined unloading position.

2. The apparatus as defined in claim 1, wherein said transfer tray is movable between said substantially horizontal loading position and said inclined transitional position by actuation means.

3. The apparatus as defined in claim 2, wherein said actuation means is electrical actuation means.

4. The apparatus as defined in claim 2, wherein said actuation means is pneumatic actuation means.

5. The apparatus as defined in claim 1, wherein said transfer tray is rotatable between said inclined transitional position and said inclined unloading position by actuation means.

6. The apparatus as defined in claim 5, wherein said actuation means is electrical actuation means.

7. The apparatus as defined in claim 5, wherein said actuation means is pneumatic actuation means.

8. A two stage feeding apparatus for feeding articles to a printing machine, said apparatus comprising a transfer tray for transferring a stack of articles from a substantially horizontal loading position to an inclined unloading position, said transfer tray being movable between said horizontal loading position and an inclined transitional position, said transfer tray being rotatable between said inclined transitional position and said inclined unloading position.

9. The apparatus as defined in claim 8, wherein said transfer tray is movable between said substantially horizontal loading position and said inclined transitional position by actuation means.

10. The apparatus as defined in claim 9, wherein said actuation means is electrical actuation means.

11. The apparatus as defined in claim 9, wherein said actuation means is pneumatic actuation means.

12. The apparatus as defined in claim 8, wherein said transfer tray is rotatable between said inclined transitional position and said inclined unloading position by actuation means.

13. The apparatus as defined in claim 12, wherein said actuation means is electrical actuation means.

14. The apparatus as defined in claim 12, wherein said actuation means is pneumatic actuation means.

15. A two stage feeding method for feeding articles to a printing machine, said method comprising the steps of:

loading a transfer tray with a stack of articles, said transfer tray being in a substantially horizontal loading position;

moving said transfer tray, along with said stack of articles, from said substantially horizontal loading position to an inclined transitional position;

rotating said transfer tray, along with said stack of articles, from said inclined transitional position to an inclined unloading position, thereby unloading said stack of articles.

* * * * *